(12) United States Patent
Bennett

(10) Patent No.: US 6,253,989 B1
(45) Date of Patent: Jul. 3, 2001

(54) PRESS FIT JOINT WITH PUDDLE WELD RETENTION

(75) Inventor: John L. Bennett, Fraser, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/484,943

(22) Filed: Jan. 18, 2000

(51) Int. Cl.[7] ............................. B23K 9/04; B23K 33/00
(52) U.S. Cl. ..................... 228/135; 228/134; 228/165; 228/139; 228/154
(58) Field of Search .................................. 228/135, 138, 228/132, 134, 165, 169, 139, 141.1, 154, 174

(56) References Cited

U.S. PATENT DOCUMENTS

| | | | |
|---|---|---|---|
| 4,205,219 | * | 5/1980 | Snell . |
| 4,265,388 | * | 5/1981 | Takahashi et al. . |
| 4,360,961 | * | 11/1982 | Chlebowski . |
| 5,169,054 | * | 12/1992 | Matsui et al. . |
| 5,348,211 | * | 9/1994 | White et al. . |

OTHER PUBLICATIONS

ASM Handbook: vol. 6 Welding, Brazing, and Soldering. Alia. p. 712–713. (no date available).*

* cited by examiner

Primary Examiner—Tom Dunn
Assistant Examiner—Jonathan Johnson
(74) Attorney, Agent, or Firm—Carlson, Gaskey & Olds

(57) ABSTRACT

An improved press fit joint is particularly useful for iron parts. An outer part receives an inner part which is press fit into a bore in the outer part. The outer part has a hole, and the inner part has a dimple which is aligned with the hole when the inner part is forced into the outer part. The dimple has a dimension which is greater than the dimension of the hole. A puddle weld is formed within the hole and in the dimple. The puddle weld thus provides a secondary retention holding the inner part within the outer part.

8 Claims, 1 Drawing Sheet

PRESS FIT JOINT WITH PUDDLE WELD RETENTION

BACKGROUND OF THE INVENTION

This invention relates to improved weld retention for press fit joints.

Press fit joints are utilized in many applications. In a typical press fit joint, an outer part has a bore with an inner diameter slightly less than the outer diameter of an inner part. The inner part is forced into the bore, and the larger diameter of the inner part holds the inner part within the outer part.

However, the press fit alone is inadequate for many applications. Thus, press fit joints are often augmented by a secondary locking mechanism. The ability to hold a press fit joint is limited by the size, material and certain manufacturing characteristics of the joint parts. This is particularly true in structural applications where there may be stresses upon the inner and outer parts.

The selection of a particular type of secondary locking mechanism is based in large part on the materials of the inner and outer parts. If both the inner and outer parts are of materials which can provide an adequate weld joint, then a weld may be utilized as the secondary locking mechanism. However, if one or both of the parts is iron, then a dowel pin is often utilized. Iron is often not capable of providing an adequate weld joint. Dowel pins extend through the outer parts and into the inner part to provide the secondary locking mechanism. However, dowel pins require machining after assembly, and thus set high manufacturing costs.

If the inner part is iron and the outer part is steel, then a puddle weld may be utilized. A puddle weld provides a bond weld on the steel part, while the weld integrity on the outer iron member is not as important. Instead, in the iron part, the puddle weld merely provides a stop. In such an application, the puddle weld provides a shear pin which does not typically bond to the outer iron member.

However, a reliable cost effective secondary locking mechanism has not been provided when both of the press fit parts are iron.

SUMMARY OF THE INVENTION

In a disclosed embodiment of this invention, a puddle weld is provided wherein the inner part is provided with a dimple to receive the puddle weld. The dimple is formed of a dimension which is greater than a dimension of a hole in the outer part. The puddle weld thus provides a locking member which locks into the dimple, securing the inner and outer parts together. This is true even though the puddle weld material may not provide a weld bond to either part. The greater size of the weld material within the dimple relative to the hole will provide the locking mechanism.

The puddle weld is preferably provided in a generally circular dimple such that it is greater in diameter than the hole through the outer part. It is preferred that the inner part is first forced into the outer part, and the puddle weld material is then moved into the dimple through the hole. The material is then caused to become fluent filling the dimple, and at least partially filling the hole. The puddle weld material then hardens, locking the two together.

While a single puddle weld of this sort may be utilized as the a secondary locking mechanism, plural circumferentially spaced puddle welds may also utilized.

One particular application for this invention is in axle housings wherein relatively large cast iron members are being held together.

These and other features of the present invention can be best understood from the following specification and drawings, the following of which is a brief description.

DETAILED DESCRIPTION OF A PREFERRED EMBODIMENT

Figure 1A:
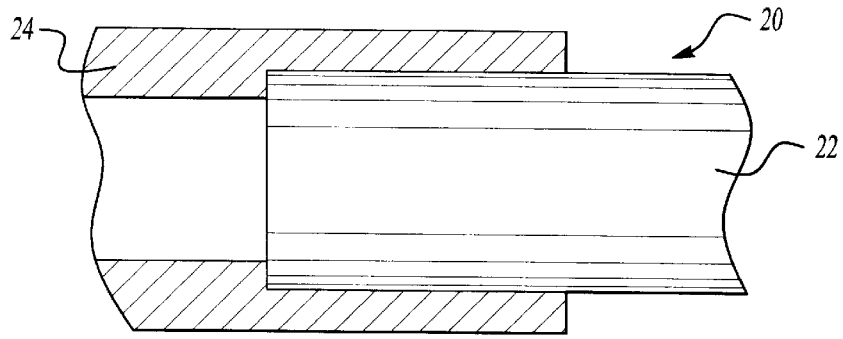
FIG. 1A shows a prior art press fit joint.

FIG. 1A schematically shows a press fit joint 20. An inner part 22 is forced into an outer part 24. The present invention is particularly well suited to provide benefits in structural applications. One envisioned application is for axle housings wherein inner and outer cast iron parts are to be secured together by a press fit joint. While the drawings may show what would appear to be cylindrical cross sections, it should be understood that shapes and sizes other than that illustrated would benefit from this invention.

Figure 1B:
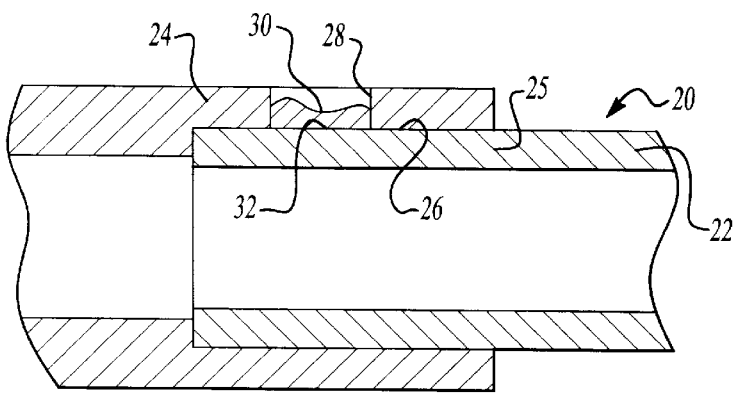
FIG. 1B is a cross section through a prior art press fit joint utilizing a prior art puddle weld.

FIG. 1B shows the joint 20 incorporating inner part 22 and an outer part 24. The outer part 24 has a bore 25. Inner part 22 has an outer peripheral surface 26. As known, the outer diameter of the inner part is sized to be greater than the inner diameter of the outer part, such that the inner part is forced into the outer part, locking the inner part within the outer part.

However, as explained above, this press fit alone does not always provide an adequate holding force. Thus, a hole 28 is formed through the outer part 24 and a puddle weld 30 is formed in the hole. The puddle weld material 30 bonds with the outer surface 32 of the inner part 22. In this application, the inner part 22 is typically steel, while the outer part 24 may be an iron material. Since the puddle weld material 30 bonds adequately to the steel part 22, a secondary locking function is provided. However, the puddle weld material 30 will not bond with an iron material, and thus this application is only useful when the inner member is steel.

Figure 2A:
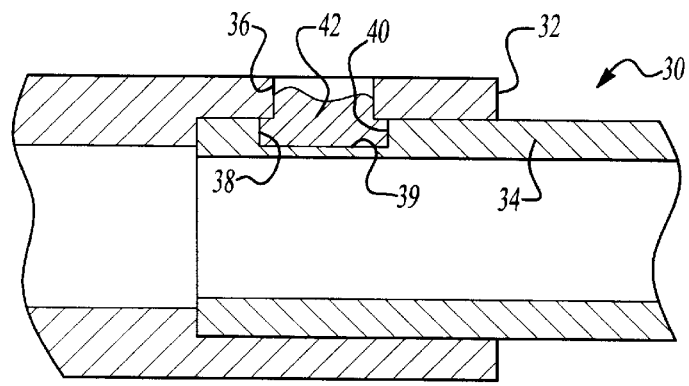
FIG. 2A shows an inventive puddle weld joint.

FIG. 2A shows an inventive press fit joint 30, wherein the inner part may be iron, and the outer part may also be iron. The outer part 32 receives the inner part 34 in a press fit. A hole 36 extends through the outer part 32. A dimple 37 is formed in an outer peripheral surface of the outer part 34. The dimple 37 has extreme ends 38 and 40 and bottom surface 39.

Figure 2B:
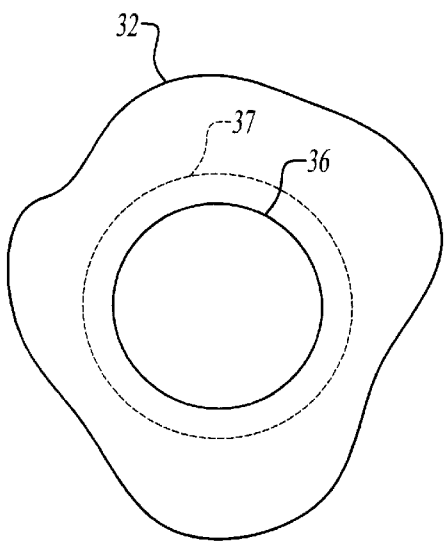
FIG. 2B shows the size of the joint.

As can be seen in FIG. 2B, the dimple 37 may be generally circular. The size of the dimple 37 is shown relative to the size of the hole 36. It should be understood that other shapes and relative sizes of the holes 36 and dimple 37 may be utilized. This invention simply requires that the dimple 37 be greater in at least one dimension than the hole 36. Most preferably, the dimple 37 is greater than the hole 36 at least in a dimension along the direction through which the two parts are press fit together.

A puddle weld material 42 is formed within the dimple 37, and extending radially outwardly at least partially into the hole 36. This puddle weld material 42 thus provides a secondary locking feature holding the parts 32 and 34 together.

Figure 2C:
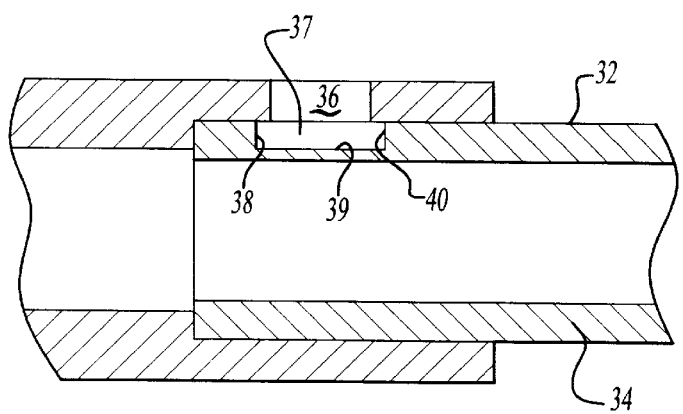
FIG. 2C shows an earlier step in the assembly of the inventive press fit joint.

FIG. 2C shows a partial assembly view of the FIG. 2A joint. The puddle weld has not yet been formed in dimple 37, or the hole 36. Instead, the part 34 has been forced into the part 32. Weld material is then moved through the hole 36 and into the dimple 37. The weld material is caused to become fluent, and flows to form the puddle weld 42 such as shown in FIG. 2A. The material is then allowed to harden, and provides the secondary locking function. Although only a single puddle weld is shown in the drawings, it should be understood that several circumferentially spaced puddle welds may be utilized.

Known puddle weld material such as nickel-iron alloy may be utilized.

Although a preferred embodiment of this invention has been disclosed, a worker in this art would recognize that modifications would come within the scope of this invention. For that reason, the following claims should be studied to determine the true scope and content of this invention.

What is claimed is:

1. A method of joining together two parts comprising the steps of:
   a) providing a first outer part with an inner bore having an inner dimension, said outer part having a hole extending from an outer peripheral surface to said inner bore, and providing an inner part, said inner part having an outer peripheral surface with an outer dimension which is greater than said inner dimension of said outer part bore, said inner part further being formed with a dimple portion of a dimension which is greater than a dimension of said hole in said outer part, both said inner and outer parts being formed of cast iron;
   b) moving said inner part within said outer part in a first direction such that said inner part is press fit within said bore of said outer part, and until said dimple in said inner part is aligned with said hole in said outer part; and
   c) moving a fluent weld material into said dimple, and at least partially into said hole, and allowing said fluid material to solidify to provide a secondary retention of said inner part within said outer part.

2. A method as set forth in claim 1, wherein said weld material is moved through said hole and into said dimple after step (b).

3. A method as set forth in claim 1, wherein said dimple has a dimension along said first direction through which said inner part is forced into said outer part which is greater than the dimension of said hole in said first direction.

4. A press fit joint comprising:
   an outer part having an inner bore of an inner dimension, and said outer part having a hole extending through a thickness of said outer part from an outer peripheral surface to said bore; an inner part having an outer peripheral surface of a dimension greater than said inner dimension of said bore in said outer part along a first direction, said inner part being force fit into said bore of said outer part, and said inner part having a dimple being aligned with said hole, such that said dimple extends for a dimension which is greater than a dimension of said hole in at least one direction; and
   a weld material received in said dimple and at least partially in said hole to provide a secondary retention securing said inner part within said outer part, both said inner and outer parts being formed of cast iron.

5. A joint as recited in claim 4, wherein said at least one direction is said first direction.

6. A joint as recited in claim 4, wherein said dimple has dimensions around the entire periphery of said hold which are greater than dimensions of said hole.

7. A method as set forth in claim 1, wherein said outer part surrounds said inner part after step (b).

8. A joint as recited in claim 4, wherein said outer part surrounding said inner part.

* * * * *